Patented July 17, 1951

2,561,137

UNITED STATES PATENT OFFICE 2,561,137

METHOD OF PRESERVING EGGS

Charles Ross, Tulsa, Okla.

No Drawing. Application August 31, 1950,
Serial No. 182,620

6 Claims. (Cl. 99—161)

1

This invention relates to the method of preserving eggs, and particularly but not by way of limitation to an improvement in the methods of egg preservation in a more economical manner, and whereby the preservation can be effected for longer periods of time, and also improving the quality of the egg over that provided by the present day methods. This is a continuation-in-part of my copending application Serial No. 730,753, entitled Method of Preserving Eggs, filed February 25, 1947, now abandoned.

It has been found that after the laying of the egg the deterioration thereof is controlled mainly by temperature and an increase in alkalinity. The temperature control is variable; however, it is usually within the limits of 32 degrees and 115 degrees Fahrenheit. Furthermore, it is well known that the action of deterioration or decomposition of the egg is slower at a lower degree of temperature than it is at a higher degree.

The present invention contemplates the provision of an economical method of overcoming the alkalinity by a plurality of separate cookings in order to obtain a more efficient preservation for the egg.

It is well known that the normal egg in its raw or uncooked state comprises the shell, the white, and the yolk, and that the white is separated from the shell by a film which is capable of penetration only by light, color, or ions of gas as will be hereinafter set forth. The white of the egg has been found to consist of gaseous ions of different properties, said ions being impressionable by globules within globules of a semi-transparent jelly like white matter. The gelatinous matter is usually of very delicate construction, supporting the yolk in the center thereof, the yolk comprising a substantially yellowish colored granular mass. Furthermore, the yolk is held together by a gaseous film surrounding the yolk between the whites. The film for the yolk is of a very delicate construction allowing freedom of passage of the ions of gas either to or from the yolk as will be hereinafter set forth.

The deterioration of the egg starts immediately after the laying thereof, and as heretofore mentioned, is controlled mainly by temperature. The increase of alkalinity is caused by the bursting of the globules in the white of the egg to release the gas ions, causing them to pass through the gas film to the yolk. During the transposition of the ions from the white to the yolk other non-essential ions, mostly of a carbonic or nitrogenous nature, are displaced or dispelled from the yolk outward through the gas-

2 eous film and continue through the sponge like pores of the white until they strike the heavy outer film adjacent the shell. In view of this action, it is well known that in order to preserve the egg it becomes necessary to change its gaseous parts to solids, usually accomplished by the application of heat, in order to place the egg in condition for immediate consumption, at the same time being palatable.

Previous attempts have been made to pickle a boiled egg after the shell has been removed; however, such pickling will not preserve the egg as is the primary object of this invention.

It is an important object of this invention to provide a process for preserving an egg in a simple and efficient manner whereupon the preservation of the egg may be for a considerable period of time.

A further object of this invention is to provide a process of preserving an egg by overcoming the alkalinity causing deterioration thereof to such an extent that the egg is maintained in its state of preservation indefinitely.

The process of preserving an egg under the present invention obviously necessitates cooking the egg in the raw state, first with the shell on, and then with the shell removed. In the first cooking step of the egg with the shell on, it is cooked until the white and the yolk substantially change to a solid, although not completely. This cooking time is usually for an hour, depending upon the freshness and condition of the egg. The white is transposed into a white spongy mass of matter, usually having a slight brownish tinge, while the gaseous film or filter between the yolk and the white forms a black carbon film caused by the residue of the bursting globules and the inner film itself. Simultaneously, the yolk is transposed from a semi-fluid state to a ball like configuration of semi-solid state. It has been found that an even penetrating heat such as provided by steam at low pressure such as a pressure from five to fifteen pounds at 212° F. furnishes a better cooking medium in that the steam permits an even fluid action that reaches all points of the egg efficiently without bursting the shell or disturbing the equilibrium of the white of the egg. Hot air cooking is uneconomical and not sufficiently expeditious, while water creates a turbulence at the necessary degree of temperature for cooking the egg which has a tendency to cause bursting of the shell or the like.

After the egg has been steam cooked within the shell, it has lost substantially all of its creative powers and is in a state to be preserved. In this condition, the yolk still retains its characteristics of magnetic attraction and expulsion, while the egg white has high absorption characteristics and particularly an absorption attraction for water or other liquids. The action of the egg in its raw state in expelling carbonic gas from the yolk through the white, previously referred to, causes the egg to have a peculiar obnoxious odor and a black carbonic silt at the rim of the yolk after the cooking operation above set forth. Obviously due to an increase in alkalinity, the older the egg at the time of the first cooking, the greater amount of carbonic silt will be present adjacent the periphery of the yolk. In order to preserve the egg for considerable periods of time, it is necessary that these impurities such as the carbonic silt, and particularly the obnoxious odor, must be completely eliminated. This necessitates changing both the white and the yolk of the egg to a more solid, firmly hardened mass of matter.

Internal cleansing of the egg

Subsequent to the first cooking of the egg the shell is removed and the egg is placed in a receptacle containing water, which causes the egg to immediately wash itself internally, due to the magnetism of the yolk which will draw liquids such as water or the like through the sponge-like white thereto. The yolk needs only a small part of the liquid absorbed and consequently expels any surplus outwardly therefrom, providing a continuous flow whereupon most of the impurities are dissolved in the flowing liquids. In this condition, the washing liquid changes to a lemon-green coloring caused by the absorption of the impurities in the substantially solid egg. However, some of the carbonic deposit in the periphery of the yolk is too voluminous to be readily dissolved in plain water, and it is sometimes necessary to add a dissolving agent with the water to expedite the release of the impurities from the egg. Any conventional dissolving agent such as a lesser concentrated acid is sufficient for this additional dissolving purpose. While water will normally dissolve the waste matter, it is usually slow, and the acid dissolving agent is utilized to expedite the washing operation. There are several acids which will accomplish this purpose without harm to the product, particularly acids which are formed under the influence of the organism "My Coderma Aceti" in its action on juice or vegetation such as fruit or grain juices, such as ½ to 1% by volume of acetic acid or the like. The decomposed part of the egg is quickly soluble in the dissolving agent. Under test, it has been found that the washing or cleansing of the egg usually requires from eight to sixteen hours, according to the age of the egg at the time of the first cooking. During the cleansing or washing process, and the removing of the carbonic impurities therefrom, the egg being sponge-like or semi-solid, retains a substantial amount of the fluid flowing therethrough which must necessarily be removed. The excess liquid in the egg would, of course, eventually be evaporated when the egg was removed from the washing liquid; however, the extended time required for this evaporation process to take place would be detrimental both to the structure of the egg tissue and the palatability of the egg. Consequently, an additional step is necessary in the process to preserve the egg, which consists of removing the egg from the cleansing water and then thoroughly washing on the outer periphery thereof. The egg is then placed in a suitable vessel having sufficient water to cover the egg to which a small amount of acid, usually in the order of $\frac{1}{10}$ of 1% (by volume), may be added. The egg is then cooked in the water at a temperature of 200 to 210 degrees Fahrenheit, and maintained at this temperature from two to four hours, according to the freshness and quality of the egg. The most satisfactory results are obtained by first heating the liquid to a temperature of 95 to 100 degrees Fahrenheit, placing the eggs in the liquid, and then increasing the temperature slowly to a temperature of 200 to 210 degrees Fahrenheit. In this manner, the egg is not subjected to a sudden contraction which may burst the white thereof and result in a consequent loss of the egg. This latter cooking process results in a firmer hardening and greater solidification of both the white and the yolk of the egg, which consequently causes an elimination of any excess moisture which may have remained in the egg from the cleansing process. Furthermore, it will be apparent that all the impurities and obnoxious odors previously present in the egg will be removed. At the end of the latter cooking time, the egg will take on a pleasant cooked odor indicating that all impurities have been completely removed, and it is in condition for the last step of the process necessary to preserve the egg.

It has been found under test that the composition of the egg is allergic to any metals with few exceptions and if allowed to come into contact with a metal, it will have a tendency to oxidize at any point of contact, thus causing a discoloring or blackening of the egg at point of contact. This discoloring will have a tendency to spread throughout the entire white of the egg. In view of this characteristic, it has been found that the last step of processing the egg should be done in glass crockery or porcelain enamel ware. However, Monel metal is one of the few exceptions and the egg may be processed in a vessel of Monel metal without creating any substantial discoloring heretofore mentioned.

Several conventional methods of maintaining a preserved egg are well known, and it has been found that an egg having been processed by the cooking steps heretofore set forth will be maintained in a state of preservation if kept in perfectly sterilized tap water that is reasonably free of minerals and chemicals. Any suitable vegetable oil, vinegar or the like, may be used as a medium for maintaining the processed egg in its preserved state. Furthermore, it may be ground up and mixed with other foods and preserved in any conventional manner. The processed egg may also be placed in a glass container with sufficient moisture to keep it from drying out, which is sufficient to maintain it in a perfect state of preservation. The processed egg may be disposed in the open air and will not spoil over a considerable period of time, although it may dry up due to the air taking out the moisture therefrom. No refrigeration is necessary and the processed egg can be kept in a state of preservation at any reasonable temperature.

From the foregoing, it will be apparent that the present invention contemplates substantially three steps for preserving an egg in that the egg is first cooked with the shell on, the shell is then removed and the egg is washed to eliminate impurities, and then a last stage of cooking is provided in order to create the state of preservation desired. In this manner, a completely preserved egg is provided which will remain in such state for an indefinite length of time, and yet be eatable and palatable for any of various purposes desired.

Changes may be made in the specification without departing from the spirit of the invention within the scope of the following claims as set forth.

I claim:

1. The method of preserving eggs which consists of cooking freshly laid unshelled eggs for approximately one hour's time until they are changed to a state of substantial solidity, removing the shells of the cooked eggs, washing the shelled eggs by placing in a receptacle containing water for a period of eight to sixteen hours, and then cooking the shelled and washed eggs at a temperature of 200 to 210 degrees Fahrenheit from two to four hours to eliminate any excessive moisture from the washing thereof.

2. The method of preserving eggs which consists of cooking unshelled eggs until the whites thereof have a brownish tinge, removing the shells of the cooked eggs, washing the shelled eggs in water for a period of eight to sixteen hours, and then cooking the shelled and washed eggs at a temperature of 200 to 210 degrees Fahrenheit from two to four hours to eliminate the excessive moisture therein.

3. The method of preserving eggs which consists of cooking unshelled eggs until the whites thereof are changed to a state of substantial solidity, removing the shells of the cooked eggs, washing the shelled eggs by placing in a receptacle containing a dilute acid to eliminate the impurities therefrom, and then cooking the shelled and washed eggs to eliminate the excessive moisture therein.

4. The method of preserving eggs which consists of cooking unshelled eggs until the whites thereof are changed to a state of substantial solidity having a brownish tinge, removing the shells of the cooked eggs, washing the shelled eggs by placing in a receptacle containing a dissolving fluid consisting of a mixture of water and approximately ½ of 1% of a dilute acid from eight to sixteen hours, and then cooking the shelled and washed eggs at a temperature of 200 to 210 degrees Fahrenheit from two to four hours to eliminate the excessive moisture therein.

5. The method of preserving eggs which consists of cooking unshelled eggs by steam until the whites thereof are changed to a state of substantial solidity having a slight brownish tinge, shelling the cooked eggs, washing the eggs by placing in a receptacle containing a dissolving fluid consisting of a mixture of water and a dilute acid from eight to sixteen hours to eliminate impurities therefrom, and then additionally cooking the shelled and washed eggs at a temperature approximating 210 degrees Fahrenheit from two to four hours to eliminate any excess moisture from the washing thereof.

6. The method of preserving eggs which consists of cooking unshelled eggs by steam at a pressure of from five to fifteen pounds at 212 degrees Fahrenheit for approximately one hour, removing the shells of the cooked eggs, washing the shelled eggs by placing in a receptacle containing a dilute acid from eight to sixteen hours, and then cooking the shelled and washed eggs in a dilute acid at a temperature of 200 to 210 degrees Fahrenheit from two to four hours to eliminate the excessive moisture therein.

CHARLES ROSS.

REFERENCES CITED

The following references are of record in the file of this patent:

"The Dictionary of Cookery"; 1877, by Cassell, published by Cassell, Petter, Galpin & Co., London, Paris, and New York, page 201, article entitled "Eggs, Pickled."

"The Structure and Composition of Foods"; 1937, by A. L. Winton et al., vol. III, published by John Wiley and Sons, Inc., New York, page 215.

"The American Woman's Cook Book"; 1945, by R. Berolzheimer, published by the Consolidated Book Publishers, Chicago, pages 372 and 373, article entitled "Pickled Eggs."